(12) United States Patent
Turczyn et al.

(10) Patent No.: US 11,818,588 B2
(45) Date of Patent: Nov. 14, 2023

(54) METHOD AND APPARATUS TO GENERATE WIRELESS NETWORK AREAS OF INTEREST

(71) Applicants: AT&T Intellectual Property I, L.P., Atlanta, GA (US); AT&T Mobility II LLC, Atlanta, GA (US)

(72) Inventors: William Turczyn, Clinton, NY (US); Arun Jotshi, Parsippany, NJ (US); Todd Fleming, Rensselaer, NY (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 284 days.

(21) Appl. No.: 17/389,444

(22) Filed: Jul. 30, 2021

(65) Prior Publication Data
US 2022/0377569 A1    Nov. 24, 2022

Related U.S. Application Data

(60) Provisional application No. 63/189,906, filed on May 18, 2021.

(51) Int. Cl.
*H04W 16/18*    (2009.01)
*H04W 4/021*    (2018.01)
(Continued)

(52) U.S. Cl.
CPC .......... *H04W 16/18* (2013.01); *H04W 4/021* (2013.01); *H04W 24/02* (2013.01); *H04W 28/0861* (2023.05); *H04W 28/0289* (2013.01)

(58) Field of Classification Search
CPC .............................. H04W 16/00; H04W 16/18
See application file for complete search history.

(56) References Cited

U.S. PATENT DOCUMENTS 8,364,155 B1 *  1/2013  Ahmed ................. H04W 16/22
                                                       455/446
9,723,588 B1    8/2017  Urrutia et al.
(Continued)

FOREIGN PATENT DOCUMENTS

WO    WO-2020123208 A1    6/2020

OTHER PUBLICATIONS

"5G", Wikipedia: https://en.wikipedia.org/wiki/5G, available at least as of May 10, 2021, May 10, 2021, 29 pgs.
(Continued)

*Primary Examiner* — Kevin Kim
(74) *Attorney, Agent, or Firm* — GUNTIN & GUST, PLC; Andrew Gust

(57) ABSTRACT

Aspects of the subject disclosure may include, for example, identifying geographic clusters that are similar based on metrics and geo-spatial association. Embodiments of the disclosure are directed to operations that include obtaining data corresponding to a communication network, applying a first algorithm to the data to generate a plurality of bins, generating a respective score for each bin of the plurality of bins, applying a second algorithm, based on the respective scores, to generate a plurality of clusters, and generating a graph for each cluster of the plurality of clusters, wherein vertices of each graph are represented by the bins of the cluster, and wherein edges of each graph connect the bins of the cluster to adjacent bins of the cluster. Other embodiments are disclosed.

20 Claims, 11 Drawing Sheets

(51) Int. Cl.
  *H04W 24/02* (2009.01)
  *H04W 28/086* (2023.01)
  *H04W 28/02* (2009.01)

(56) References Cited

U.S. PATENT DOCUMENTS

2009/0310501 A1* 12/2009 Catovic ................ H04W 24/08
                                                           370/252
2017/0245238 A1   8/2017 Kim et al.
2022/0377570 A1   11/2022 Kanza et al.

OTHER PUBLICATIONS

"Atoll Overview", Atoll Radio Planning Software Overview (RF Planning and Optimisation) | Forsk, available at least as of May 10, 2021, 6 pages.
"Attenuation", Wikipedia, available at least as of May 10, 2021, 8 pages.
"Free-space path loss", Wikipedia, available at least as of May 10, 2021, 5 pages.
"Photon mapping", Wikipedia, available at least as of May 10, 2021, 4 pages.
"Quadtree", Wikipedia, available at least as of May 10, 2021, 12 pages.
"Radio propagation", Wikipedia, available at least as of May 10, 2021, 13 pages.
"Signal-to-interference-plus-noise ratio", Wikipedia: https://en.wikipedia.org/wiki/Signal-to-interference-plus-noise_ratio, available at least as of May 10, 2021, May 10, 2021, 3 pgs.
"TensorFlow Core", Machine Learning for Beginners and Experts, Visit Forum https://discuss.tensorflow.org, available at least as of May 10, 2021, 8 pages.
Alla Chaitanya, Chakravarty R. et al., "Interactive Reconstruction of Monte Carlo Image Sequences using a Recurrent Denoising Autoencoder", ACM Transactions on Graphics, vol. 36, No. 4, Article 98, Jul. 2017, 12 pages.
Jensen, Henrik W., "Global Illumination using Photon Maps", Extended version of Rendering Techniques '96 (Proceedings of the Seventh Eruographics Workshop on Rendering), 1996, 17 pages.

* cited by examiner

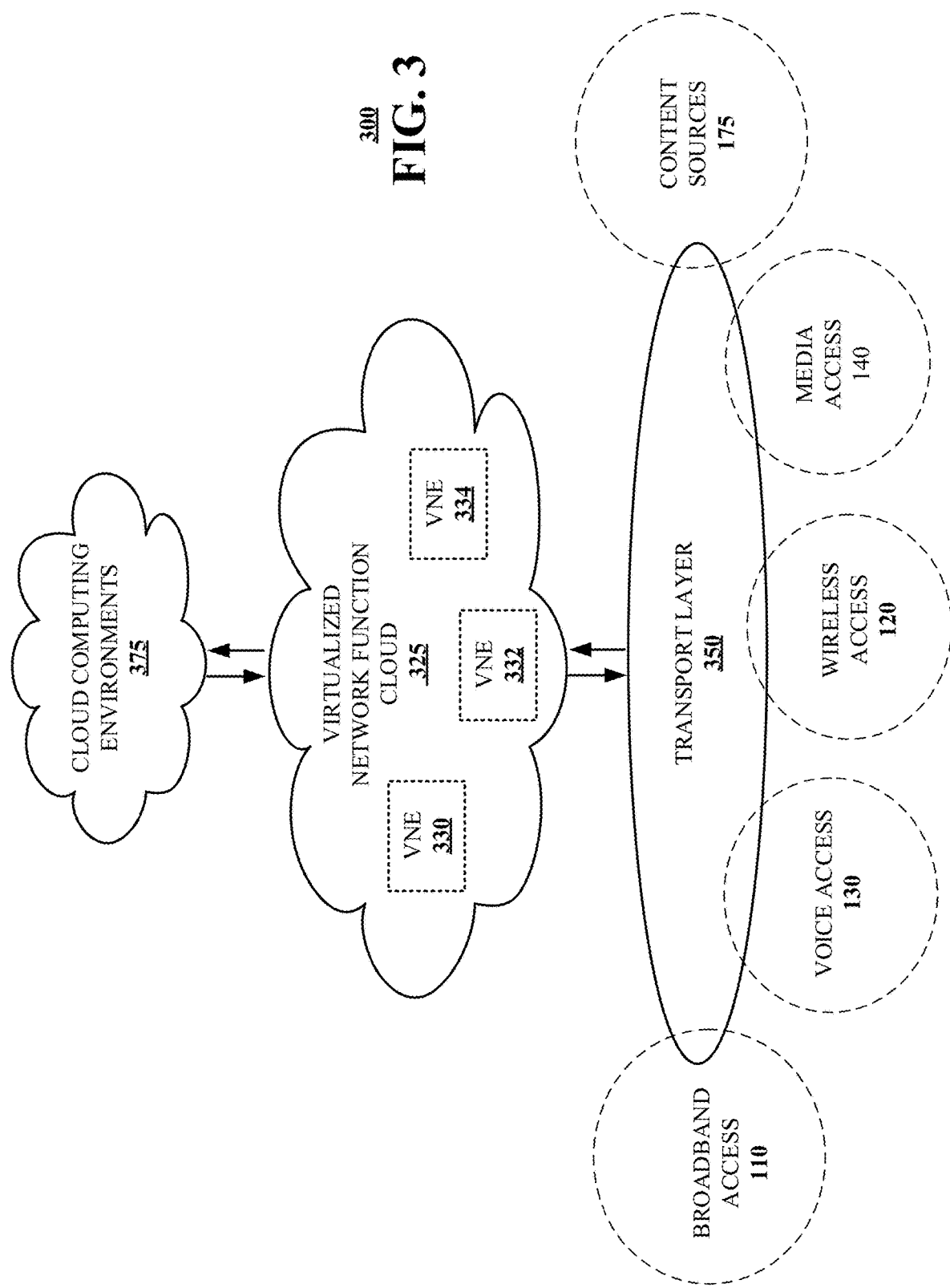

METHOD AND APPARATUS TO GENERATE WIRELESS NETWORK AREAS OF INTEREST

CROSS REFERENCE TO RELATED APPLICATIONS

The present application claims the benefit of priority to U.S. Provisional Patent Application No. 63/189,906 filed on May 18, 2021. All sections of the aforementioned application are incorporated herein by reference in their entirety.

FIELD OF THE DISCLOSURE

The subject disclosure relates to a method and apparatus to generate wireless network areas of interest.

BACKGROUND

One of the main activities in planning of cellular networks is deciding where to position equipment such as the cellular antennas. Choosing antenna and/or other equipment locations is needed for building a reliable cellular network, with good coverage and reduced or no interference between transmissions.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying geographic clusters that are similar based on metrics and geo-spatial association. Often network planners use geographic information system (GIS) software and various geo-spatial data sets to highlight areas of interest. Often these areas of interest pertain to radio signal strength or capacity. That approach is highly manual and often sub-optimal. The metrics selected in these scenarios are not always similar. Once the data is generated, an automated graph algorithm can be used for identifying areas of interest for network planners to investigate. Conventionally the geographic areas are highlighted based on metrics selected from crowd sourced data acquired from service provider handsets. The source of metrics is not fixed; other data sets could be leveraged using this approach. The key is to bin the metrics into a grid of N sized bins. Any data that has a geo-spatial component could be leveraged; some examples include census population, buildings, roads, cities, towns, villages, etc. Combing these points of interest along with crowd soured data on the service provider network performance may be used to highlight areas of interest. The algorithm can be based on a three-stage pipeline: 1. The first stage of data aggregation; collects metrics and bins them to a uniform grid of N size in meters. The grid size is variable depending on the scenario. 2. The second stage involves weighting the metrics and stack ranking all bins to create a score. When the score has been generated, a 1 dimensional k-means may be run on it to generate clusters that are similar in score. Once every bin has a cluster assigned, a geospatial association is generated. The geographic association need not be fixed. For one exemplary purpose the association may be set to bins that touch with similar scores. That is the criteria for creating edges between vertices. 3. The last stage takes the adjacency matrix and runs the graphing algorithm to create subgraphs. These areas are then leveraged by network planners to ensure capital is being directed to the most impactful locations. The data is also used to verify the network planners have not missed areas of interest for network investment. With the explosion of mobile traffic and ever-increasing shift in usage patterns across multiple applications like video, gaming, Internet of Thing (IoT) and new advancements in technology (5G mmWave, 6G+), there is a need to plan a wireless network in an optimal way. Often time the process is time-consuming and manual. The embodiments set forth herein help to scale the process by automatically identifying areas of interest that a telecom carrier should monitor and deploy solutions to provide or enhance coverage or improve quality of the network to provide exceptional user experience. It is believed that this can be critical for telecom carriers. Other embodiments are described in the subject disclosure.

Figure 1:
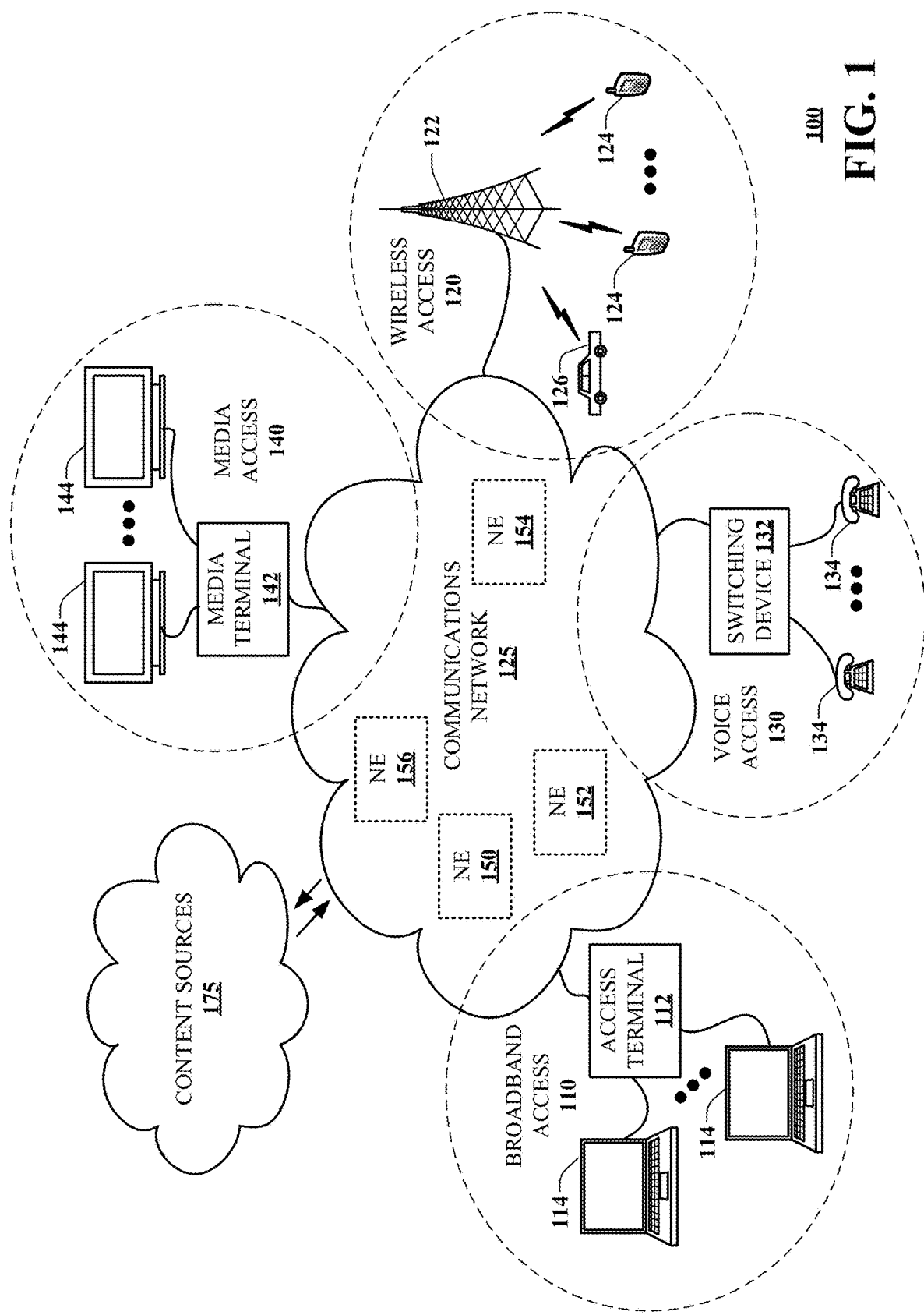
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part utilizing binned data or other information to identify clusters that can be utilized in network deployment and planning. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2E are block diagrams illustrating or otherwise related to an example, non-limiting embodiments of one or more systems functioning within the communication network of FIG. 1 in accordance with various aspects described herein. The goal of the approach is to identify geographic clusters that are similar based on metrics and geospatial association. Often network planners use GIS software and various geospatial data sets to highlight areas of interest. Often these areas of interest pertain to radio signal strength or capacity. The approach is highly manual and often sub-optimal. The metrics selected in these scenarios are not always similar. Once the data is generated, an automated graph algorithm can be used for identifying areas of interest for network planners to investigate. Conventionally the geographic areas are highlighted based on metrics selected from crowd sourced data acquired from service provider handsets. The source of metrics is not fixed; other data sets could be leveraged using this approach. The key is to bin the metrics into a grid of N sized bins. Any data that has a geo spatial component could be leveraged; some examples include census population, buildings, roads, cities, towns, villages, etc. Combing these points of interest along with crowd soured data on the service provider network performance may be used to highlight areas of interest.

The algorithm is based on a three-stage pipeline:

The first stage of data aggregation; collects metrics and bins them to a uniform grid of N size in meters. The grid size is variable depending on the scenario.

The second stage involves weighting the metrics and stack ranking all bins to create a score. When the score has been generated, a 1 dimensional k-means is run on it to generate clusters that are similar in score. Once every bin has a cluster assigned, the geospatial association is generated. The geographic association need not be fixed. For some purposes the association may be set to bins that touch with similar scores. That is the criteria for creating edges between vertices.

The last stage takes the adjacency matrix and runs the graphing algorithm to create subgraphs. These areas are then leveraged by network planners to ensure capital is being directed to the most impactful locations. The data is also used to verify the network planners have not missed areas of interest for network investment.

With the explosion of mobile traffic and ever-increasing shift in usage patterns across multiple applications like video, gaming, IoT and new advancements in technology (5G mmWave, 6G+), there may be a need to plan a wireless network in an optimal way. Often time the process is time-consuming and manual. The embodiments of this disclosure help to scale the process by automatically identifying areas of interest that a telecom carrier should monitor and deploy solutions to provide or enhance coverage or improve quality of the network to provide exceptional user experience.

Service providers and network operators, such as large telecom carriers, spend billions of dollars annually to determine the placement of telecom equipment to optimally cover a geographical area. The approach to node placement is labor-some and requires analysis of many sets of data in order to home in on specific areas. An algorithm that simplifies this process can result in large cost savings. Aspects of this disclosure feature a three-stage algorithm that involves data acquisition/binning, data mining and subgraph creation for areas of interest. Conventional methods often result in network planners spending many hours poring over the data in GIS tools creating choropleth maps to highlight areas of interest. The processes set forth herein successfully addresses this issue of locating areas of interest and serve to highlight existing areas that planners have designated for network investment.

Figure 2A:
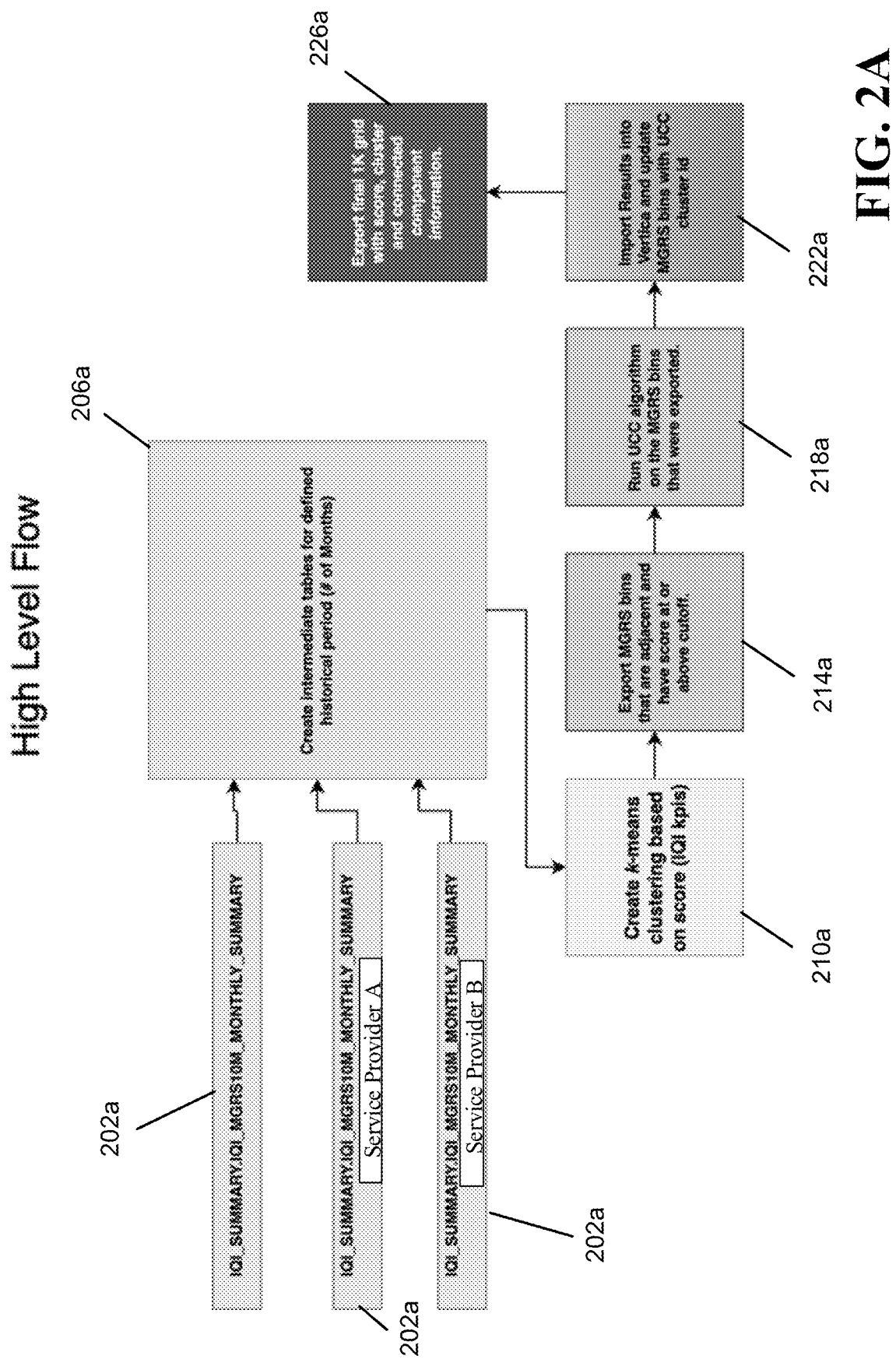
FIG. 2A-2E are block diagrams illustrating an example, non-limiting embodiments of systems functioning within the communication network of FIG. 1 in accordance with various aspects described herein.
Figure 2B:
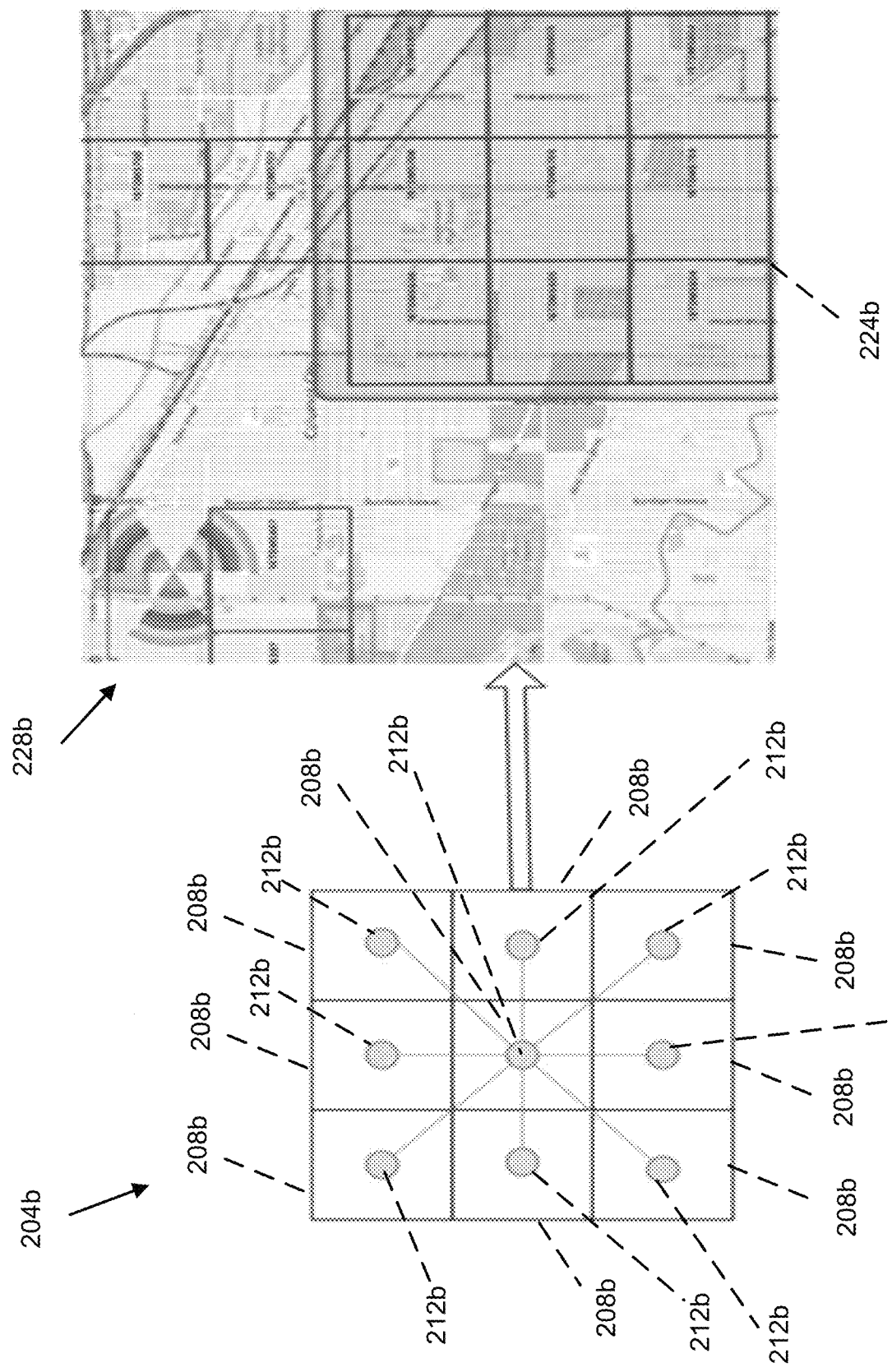

A flow process is illustrated in FIG. 2A and modeling of an example connected component in FIG. 2B. As shown in FIG. 2A, metrics or data 202a may be obtained from/for one or more service providers (e.g., Service Provider A, Service Provider B, etc.). The metrics/data 202a may be obtained for a defined time/historical period, such as for example one month. The metrics/data 202a may be used to create/generate (intermediate) tables 206a for the defined time period. The tables 206a may be representative of one or more of the bins or the grid described above. The tables 206a may be used to create a k-means clustering 210a, where the clustering 210a may be based on or more scores as set forth above. In some instances, the scores may be representative of qualities/parameters (IQI) or key performance indicators (KPIs). In block 214a, those bins that touch or are adjacent to one another with similar scores (e.g., scores that are similar to one another within a threshold amount or at or above a cutoff) may be identified/exported for use in block 218a. In some embodiments, the bins may conform to a military grid reference system (MGRS) or other representation. In block 218a, an algorithm (e.g., a U Control chart (UCC) algorithm) may be run/executed on the bins that were exported as part of block 214a, and the results of the executed of the algorithm may be imported (e.g., may be imported into an analytic database management program, such as one or more programs provided by Vertica Systems of Cambridge, Mass.) in block 222a. In block 226a, a final grid may be exported/provided, potentially along with additional information such as one or more scores, identifications of clusters, connected-component information, etc.

To demonstrate a generation of outputs of the flow process of FIG. 2A, a graph 204b for (a set of) MGRS bins is shown in FIG. 2B. In particular, the graph 204b is shown as including nine bins 208b, where the centroid of each bin 208b is shown via a vertex 212b. The lines or edges connecting the various vertices 212b denote MGRS bin touches/adjacencies (in this regard, in FIG. 2B the lead-lines associated with the reference characters 208b and 212b have been denoted via dashed lines so as to avoid confusion with the lines/edges connecting the various vertices 212b). The graph 204b may be representative of a portion of a geographical area/region, denoted by the box/quadrant 224b superimposed upon a map 228b.

The goal of the foregoing approach represented in FIGS. 2A and 2B may be to use binned data to identify clusters that are similar based on metrics selected. Often radio access network (RAN) engineers will pull binned data and will create choropleth maps on various metrics to highlight areas of interest. Using the UCC algorithm and metrics, a structure may be built/established around the bins in order to guide exploration to the most important areas. Subgraphs may then be built/established that are related by metrics (variable) and distance. Attributes, like number of vertices in the subgraphs, may be used to guide exploration for worst performing clusters. As an example, the problem statement may be modeled as a graph, where the vertices are the MGRS bins (centroid), and the edges may be added based on the following criteria/rules: (1) they are adjacent/touch, and (2) they are in the same cluster based on their score.

Rule one is fixed based on the geographical characteristics of the bins, while the second rule is variable and dynamic. Metric selection will vary based on the network issues one intends to highlight or focus on. Examples of the configuration for rule two would be as follows: poor coverage for new site build (NSB) planning; capacity limited sites for cell offload; and hot spots for small cell planning.

Figure 2C:
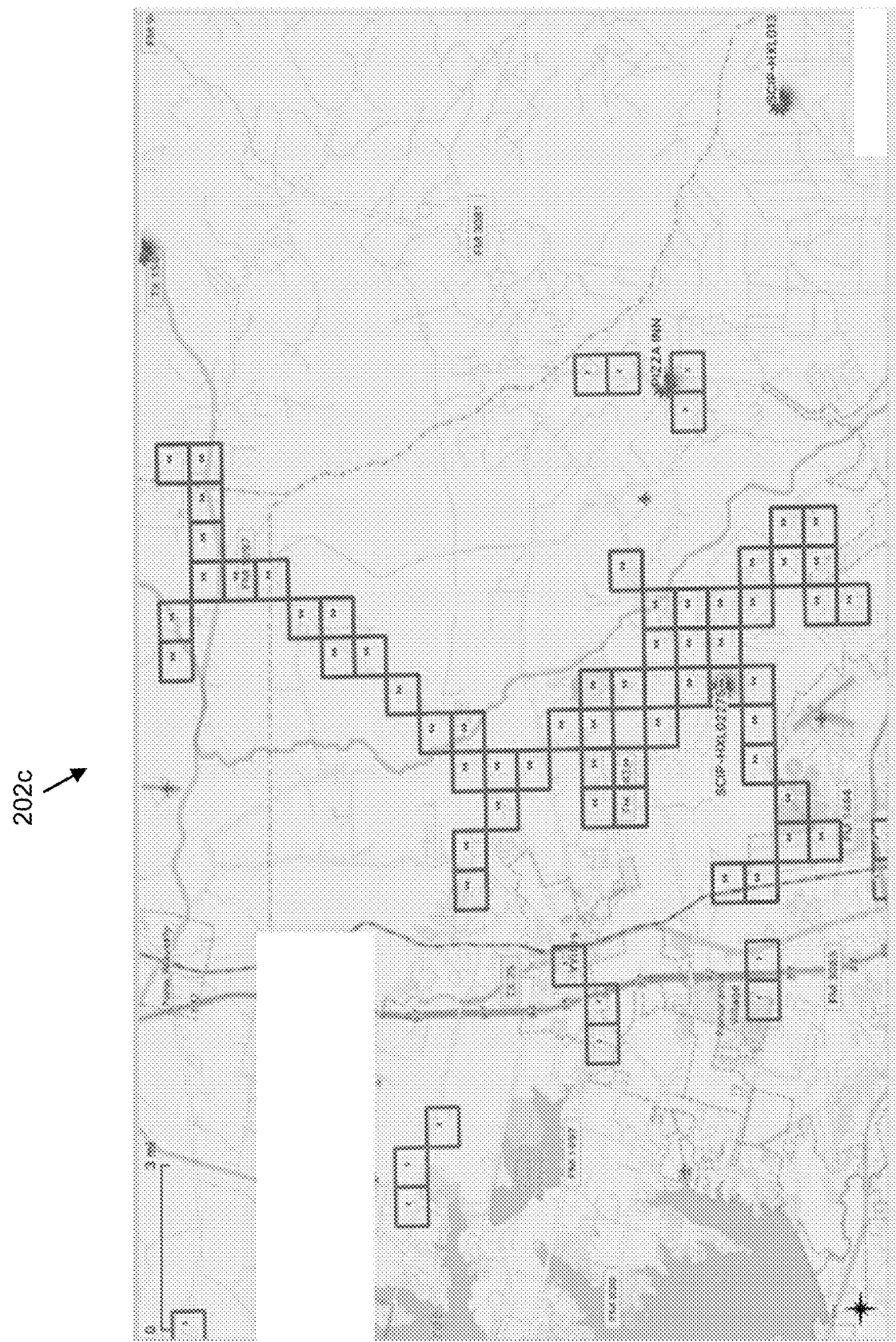

As can be seen in FIG. 2C, which is a highlighted area of interest 202c in an exemplary embodiment, one may be able to quickly find this area 202c based on the number of bins or vertices in a graph or subgraph associated with the area. This allows the engineer or network planner to quickly navigate to poorly performing areas based on the metric selection. In some embodiments, bins or clusters represented within the area 202c may be distinguished from one another using different colors (or other characteristics) to provide the engineer or network planner with indications (e.g., visual indications) of how the bins or clusters differ from one another.

Figure 2D:
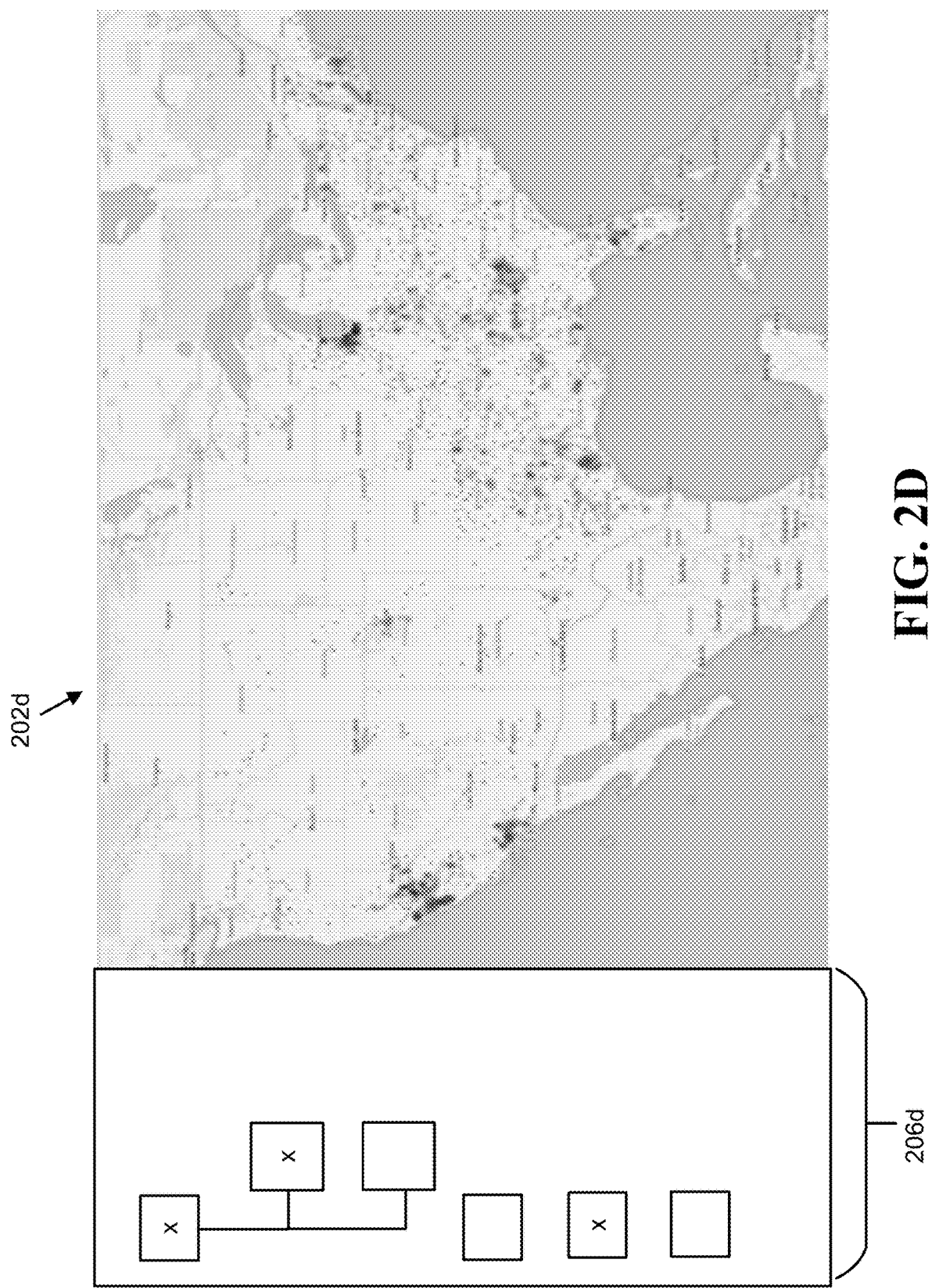

FIG. 2D, which is a national view heatmap 202d on vertices in a subgraph, illustrates the binned data at a national level (e.g., lower-48 states of the United States) and highlighted areas of interest based on the metric selection (which may be driven or facilitated by user-generated inputs provided/obtained via a menu interface 206d or the like, where the user-generated inputs are indicated by a selection or 'x' in various ones of the boxes of the menu 206d, and where each box may correspond to a particular option). The scenario will dictate the metrics that are selected. The heat map visualization is leveraged to allow network planners to quickly focus in on specific areas.

Figure 2E:

FIG. 2E, which is an example highlighting the algorithm output, shows how using the metrics and the UCC algorithm will provide/indicate highlighted areas that a RAN engineer has already selected for a NSB. The metrics for the study associated with FIG. 2E were biased to highlight poor signal areas. The hammers (various ones of which are labeled via reference characters 202e) and the NSB points on the map of FIG. 2E are locations where a RAN engineer has targeted to install equipment to address network problems. The algorithm has created subgraphs around these locations, potentially with no knowledge other than the data.

The automated, data mining and graph methodology set forth herein can lead to large cost savings and gains in operational efficiency for a service provider over the conventional approach of sending out contractors to inspect sites, which is highly time-intensive and labor-intensive.

Figure 2F:
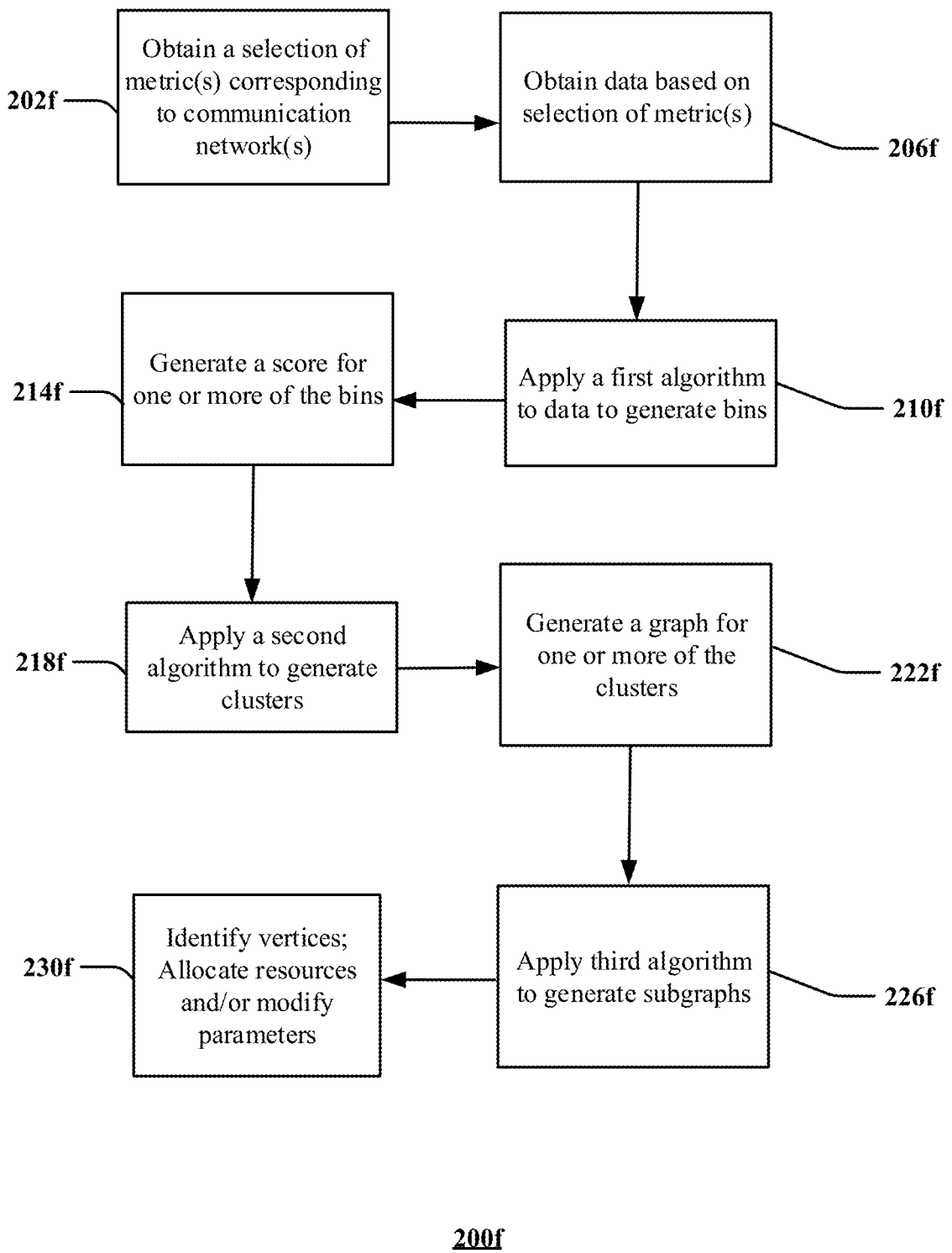
FIG. 2F depicts an illustrative embodiment of a method in accordance with various aspects described herein.

Referring now to FIG. 2F, an illustrative embodiment of a method 200f in accordance with various aspects described herein is shown. The method 200f may be facilitated (e.g., executed), in whole or in part, by one or more systems, devices, and/or components, such as for example the systems, devices, and components set forth herein.

In block 202f, a selection of one or more metrics corresponding to one or more communication networks may be obtained. In some embodiments, the one or more metrics may include or pertain to: a signal strength, interference, noise, a coverage of one or more portions (e.g., a first portion) of the communication network(s), a respective capacity (e.g., a first capacity and a second capacity) of one or more cells (e.g., a first cell and a second cell) of the communication network(s), loads associated with the communication network(s) (inclusive of any loads associated with particular cells), or any combination thereof.

In some embodiments, the one or more communication networks referred to above as part of block 202f may include a 5G millimeter (mm) Wave network, a 6G network, or a combination thereof. In some embodiments, the communication network(s) may provide support for video, gaming, IoT communications, or any combination thereof; in some embodiments, one or more applications may be utilized/executed to facilitate one or more services in support.

In block 206f, data may be obtained based on the selection of block 202f. For example, block 206f may include filtering second data based on the selection of the metric(s) in block 202f to obtain the data in block 206f. In this respect, block 206f may include obtaining the second data, where the second data may be associated with a universe of metrics that is available for selection as part of block 202f.

In some embodiments, the data (or second data) that is obtained as part of block 206f may include data from one or more handsets, user equipment, client devices, routers, modems, gateways, switches, servers, base stations, or any other communication device. In some embodiments, the data (or second data) that is obtained as part of block 206f may include or correspond to census population data, building data, road data, city-based data, town-based data, village-based data, or any combination thereof.

In block 210f, a first algorithm may be applied to the data obtained as part of block 206f. The first algorithm may include a data binning algorithm. The application of the first algorithm to the data as part of block 210f may result in a generation of a plurality of bins (e.g., geographic bins).

In block 214f, a score may be generated for one or more of the bins of block 210f. For example, the score may be generated based on weighting elements of the data and stack ranking the bins to generate the scores.

In block 218f, a second algorithm may be applied, based on the scores of block 214f, to generate a plurality of clusters. For example, block 218f may include an application of a one-dimensional k-means (clustering) algorithm.

In block 222f, a graph may be generated for one or more of the clusters of block 218f. Vertices of each graph may be represented by the bins of the respective cluster, and edges of the graph may connect the bins of the respective cluster to adjacent bins of the cluster.

In block 226f, a third algorithm may be applied to the graph(s) of block 222f to generate one or more subgraphs. For example, the application of the third algorithm may serve to identify one or more elements/members or portions of a given graph that are similar to one another with a threshold amount. In some embodiments, block 226f may include running/executing a graphing algorithm upon an adjacency matrix or the graph(s) of block 222f to generate the subgraph(s).

In block 230f, a number of vertices associated with a given subgraph of block 226f may be identified. As part of block 230f, resources of the communication network(s) may be allocated based on the number of vertices identified. For example, a large number of vertices may be indicative of a situation deserving a large allocation of resources. Conversely, a small number of vertices may be indicative of a scenario deserving of less resources. In some embodiments, an allocation of resources may include redirecting communication traffic associated with a first cell to a second cell; such a redirection may be based on the respective capacities of the cells, the respective loads of the cells, etc.

In some embodiments, block 230f may include identifying one or more parameters of the communication network(s) to modify in accordance with (an analysis of) one or more graphs (of block 222f) or subgraphs (of block 226f). For example, the parameter(s) may include, without limitation, one or more of: a transmission power, a receiver sensitivity, a frequency or frequency band of a communication supported by the communication network(s), a radio access technology (RAT) utilized by a communication device of the communication network(s), etc., or any combination thereof. Block 230f may include modifying the parameter(s) (or one or more values thereof) based on the identifying.

While for purposes of simplicity of explanation, the respective processes are shown and described, it is to be understood and appreciated that the claimed subject matter is not limited by the order of any blocks, as some blocks may occur in different orders and/or concurrently with other blocks from what is depicted and described herein. Moreover, not all illustrated blocks may be required to implement the methods described herein.

Aspects of this disclosure may be included/incorporated as part of one or more practical applications. For example, aspects of this disclosure may be utilized to facilitate an allocation of one or more resources associated with one or more communication networks. An allocation of resources may include the establishment and/or modification of one or more parameters or parametric values for the communication network(s).

Aspects of this disclosure may facilitate network planning, maintenance, and troubleshooting activities. For example, aspects of this disclosure may streamline/reduce the amount of time that network operators or service providers need to allocate to such activities, while at the same time enhancing the accuracy of decision-making processes. In this respect, aspects of this disclosure represent substantial improvements relative to conventional technologies in terms of, e.g., technical sophistication and cost reduction.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100. For example, virtualized communication network 300 can facilitate in whole or in part utilizing binned data or other information to identify clusters that can be utilized in network deployment and planning.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
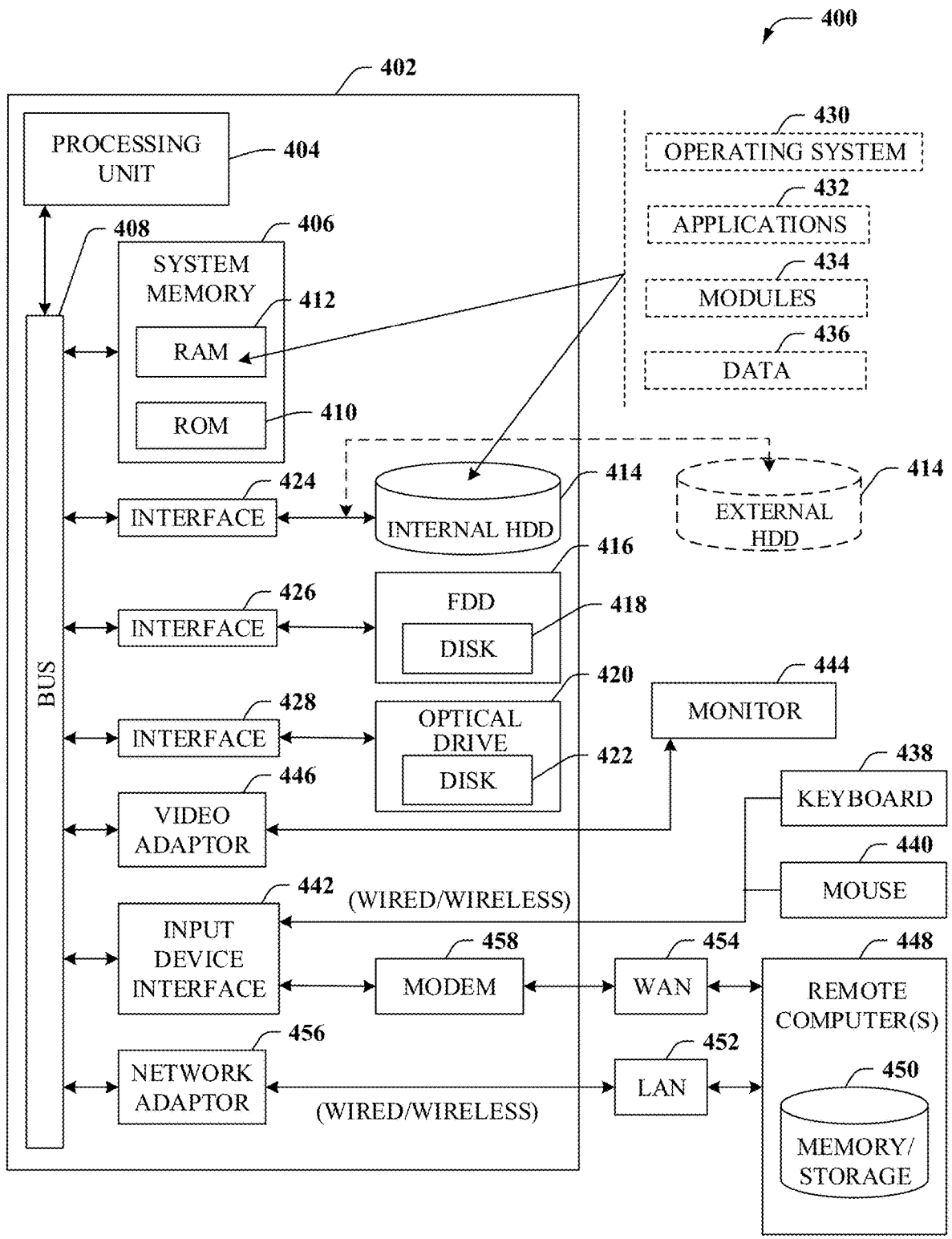
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part utilizing binned data or other information to identify clusters that can be utilized in network deployment and planning.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
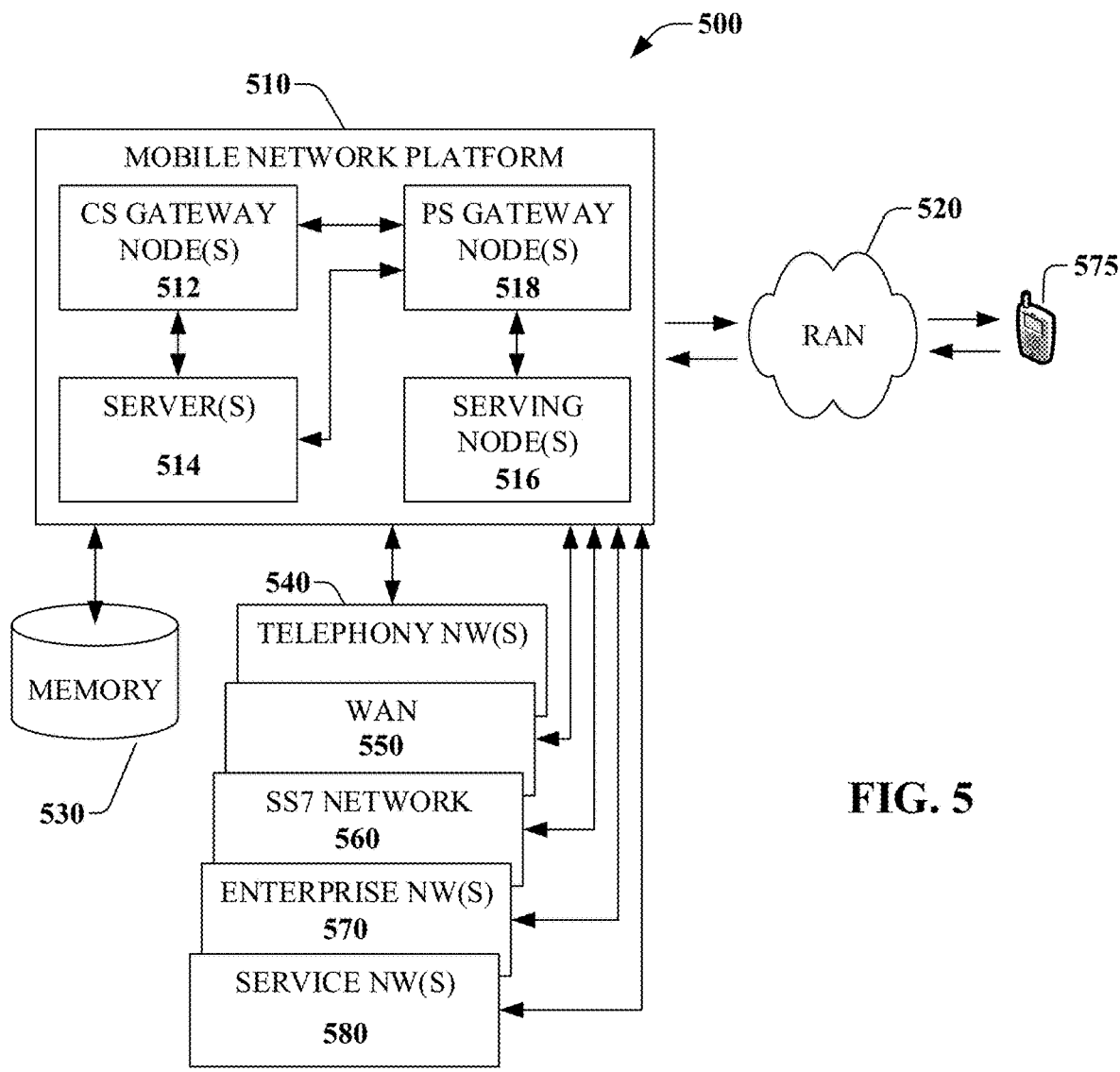
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part utilizing binned data or other information to identify clusters that can be utilized in network deployment and planning. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
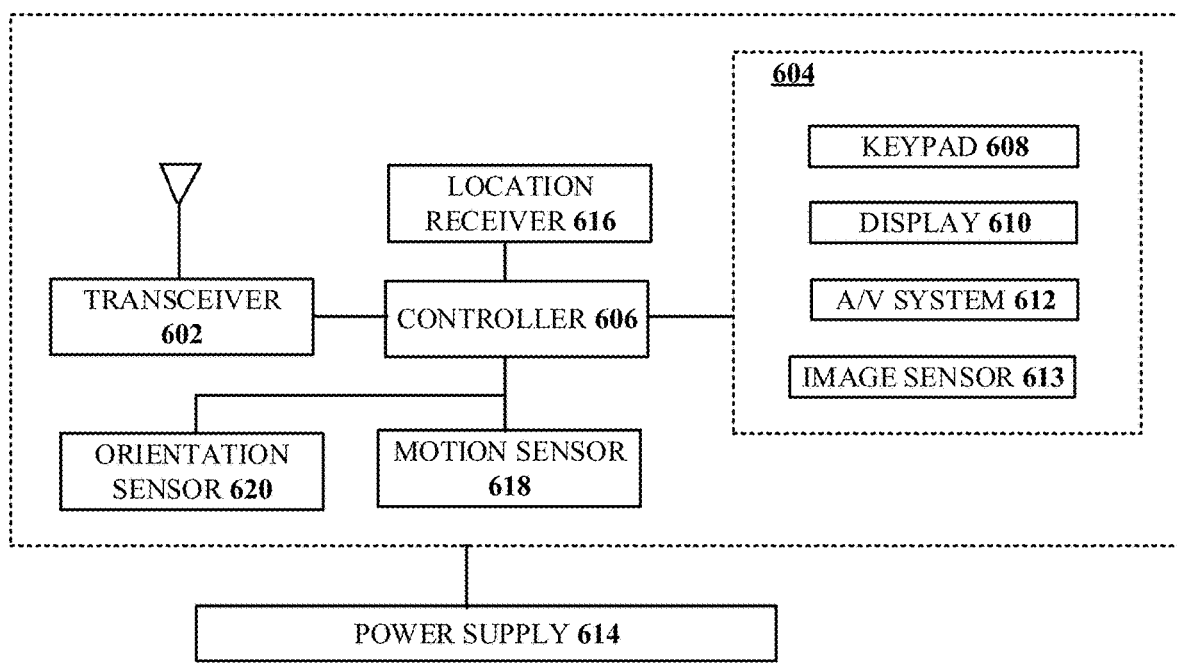
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part utilizing binned data or other information to identify clusters that can be utilized in network deployment and planning. The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1,x2,x3,x4, \ldots ,xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate a performance of operations, the operations comprising:
obtaining data corresponding to a communication network;
applying a first algorithm to the data to generate a plurality of bins;
generating a respective score for each bin of the plurality of bins;
applying a second algorithm, based on the respective scores, to generate a plurality of clusters; and
generating a graph for each cluster of the plurality of clusters, wherein vertices of each graph are represented by the bins of the cluster, and wherein edges of each graph connect the bins of the cluster to adjacent bins of the cluster.

2. The device of claim 1, wherein the first algorithm includes a data binning algorithm.

3. The device of claim 1, wherein the second algorithm includes a one-dimensional k-means algorithm.

4. The device of claim 1, wherein the operations further comprise:
applying a third algorithm to the graphs to generate a plurality of subgraphs.

5. The device of claim 4, wherein the operations further comprise:
identifying, for each subgraph of the plurality of subgraphs, a number of vertices included in the subgraph,
allocating resources of the communication network based on the identifying of the number of vertices included in each subgraph.

6. The device of claim 1, wherein the communication network supports video, gaming, Internet of Things (IoT) communications, or any combination thereof.

7. The device of claim 1, wherein the communication network is one of a 5G mmWave network or a 6G network.

8. The device of claim 1, wherein the operations further comprise:
weighting elements of the data and stack ranking the bins to generate the scores.

9. The device of claim 1, wherein the obtaining of the data comprises obtaining first data from a plurality of handsets.

10. The device of claim 9, wherein the obtaining of the data comprises obtaining second data corresponding to census population data, building data, road data, city-based data, town-based data, village-based data, or any combination thereof.

11. The device of claim 1, wherein the data is associated with a first metric included in a plurality of metrics, wherein the plurality of metrics is associated with the communication network, and wherein the operations further comprise:
obtaining a selection of the first metric; and
filtering second data based on the obtaining of the selection to obtain the data, wherein the second data is associated with the plurality of metrics.

12. The device of claim 11, wherein the plurality of metrics comprises: a signal strength, interference, noise, or any combination thereof.

13. The device of claim 11, wherein the plurality of metrics comprises a coverage of a first portion of the communication network.

14. The device of claim 11, wherein the plurality of metrics comprises a first capacity of a first cell of the communication network and a second capacity of a second cell of the communication network.

15. The device of claim 14, wherein the operations further comprise:
redirecting communication traffic associated with the first cell to the second cell based on the first capacity and the second capacity.

16. The device of claim 15, wherein the plurality of metrics comprises a first load of the first cell and a second load of the second cell, and wherein the redirecting of the communication traffic is further based on the first load and the second load.

17. A non-transitory machine-readable medium, comprising executable instructions that, when executed by a processing system including a processor, facilitate a performance of operations, the operations comprising:

applying a first algorithm to first data to generate a plurality of bins;

applying a second algorithm, based on respective scores associated with each of the plurality of bins, to generate a plurality of clusters;

generating a graph for each cluster of the plurality of clusters, wherein vertices of each graph are represented by the bins of the cluster, and wherein edges of each graph connect the bins of the cluster to adjacent bins of the cluster; and allocating resources of a communication network based on the generating of the graph for each cluster of the plurality of clusters.

18. The non-transitory machine-readable medium of claim 17, wherein the first algorithm comprises a data binning algorithm and the second algorithm comprises a k-means clustering algorithm.

19. A method, comprising:

obtaining, by a processing system including a processor, first data based on filtering second data in accordance with a selection of at least one metric included in a plurality of metrics, the plurality of metrics associated with a communication network;

applying, by the processing system, a data binning algorithm to the first data to generate a plurality of bins;

applying, by the processing system, a one-dimensional k-means algorithm to scores associated with the plurality of bins to generate a plurality of clusters;

generating, by the processing system, at least one graph for the plurality of clusters; and identifying, by the processing system, at least one parameter associated with the communication network to modify based on an analysis of: the at least one graph, at least one subgraph associated with the at least one graph, or a combination thereof.

20. The method of claim 19, wherein the at least one parameter comprises: a transmission power, a receiver sensitivity, a frequency or frequency band of a communication supported by the communication network, a radio access technology utilized by a communication device of the communication network, or any combination thereof, the method further comprising:

modifying, by the processing system and based on the identifying, the at least one parameter.

* * * * *